(12) United States Patent
Hsieh et al.

(10) Patent No.: US 9,250,416 B2
(45) Date of Patent: Feb. 2, 2016

(54) THIN LENS MODULE

(75) Inventors: Sung-Tsun Hsieh, Taichung (TW); Tsung-Hsing Yen, Taichung (TW)

(73) Assignee: Asia Optical Co., Inc., Tortola, B.V.I. (GB)

( * ) Notice: Subject to any disclaimer, the term of this patent is extended or adjusted under 35 U.S.C. 154(b) by 94 days.

(21) Appl. No.: 13/606,573

(22) Filed: Sep. 7, 2012

(65) Prior Publication Data
US 2013/0258493 A1 Oct. 3, 2013

(30) Foreign Application Priority Data
Mar. 30, 2012 (TW) .............................. 101111447 A (51) Int. Cl.
*G03B 3/10* (2006.01)
*G02B 7/10* (2006.01)

(52) U.S. Cl.
CPC ...................................... *G02B 7/102* (2013.01)

(58) Field of Classification Search
USPC ......................................................... 396/133
See application file for complete search history.

(56) References Cited

U.S. PATENT DOCUMENTS

| | | | |
|---|---|---|---|
| 4,404,595 A * | 9/1983 | Ushiro et al. | 348/357 |
| 4,496,229 A * | 1/1985 | Ogasawara | 396/133 |
| 5,132,800 A * | 7/1992 | Wada et al. | 348/375 |
| 5,587,735 A * | 12/1996 | Ishida et al. | 348/14.04 |
| 6,549,229 B1 * | 4/2003 | Kirby et al. | 348/14.01 |
| 8,014,082 B2 * | 9/2011 | Nishikawa et al. | 359/738 |
| 2004/0109076 A1 * | 6/2004 | Yokota et al. | 348/335 |
| 2005/0140814 A1 * | 6/2005 | Katakai | 348/340 |
| 2008/0094728 A1 * | 4/2008 | Matsumoto et al. | 359/696 |
| 2008/0291543 A1 * | 11/2008 | Nomura et al. | 359/676 |
| 2009/0091272 A1 * | 4/2009 | Yamada et al. | 315/307 |
| 2009/0128931 A1 * | 5/2009 | Matsumoto | 359/823 |
| 2010/0027133 A1 * | 2/2010 | Matsui et al. | 359/676 |
| 2010/0202068 A1 * | 8/2010 | Ito | 359/823 |
| 2011/0109981 A1 * | 5/2011 | Yamamoto et al. | 359/817 |
| 2012/0169918 A1 * | 7/2012 | Hasegawa et al. | 348/372 |
| 2012/0287318 A1 * | 11/2012 | Fujinaga et al. | 348/294 |
| 2013/0060141 A1 * | 3/2013 | Sinelnikov | 600/439 |

FOREIGN PATENT DOCUMENTS

TW M376769 8/2009

OTHER PUBLICATIONS

Abstract of Taiwanese Patent No. M376769.

* cited by examiner

*Primary Examiner* — Clayton E Laballe
*Assistant Examiner* — Linda B Smith
(74) *Attorney, Agent, or Firm* — Tracy M. Heims; Apex Juris, Pllc (57) ABSTRACT

A thin lens module has a case, in which an optical lens set, an image sensor, a focusing driving device, two position indicators, a zooming driving device, a shutter, and a shutter driving device are provided. An optical axis of the optical lens set has a first optical axis section and a second optical axis section, and the first optical axis section is perpendicular to an object side. The focusing driving device, the position indicators, and the shutter driving device respectively connects to joints for signal transmission, and these joints are provided on a side of the case parallel to the first optical axis section to achieve the thinning purpose.

15 Claims, 6 Drawing Sheets

THIN LENS MODULE

BACKGROUND OF THE INVENTION

1. Field of the Invention

The present invention relates generally to a lens module, and more particularly to a thin lens module.

2. Description of the Related Art

As the improvement of technology, the image capture devices, such as digital camera, cell phone equipped with camera, video game, PDA . . . , are popular in the present market. Users may record things and check the record immediately by such image capture devices. It becomes a convenient tool for users to record things in ordinary life or for work.

In order to improve the portability of the image capture devices, the common lens structure for the image capture device is cylinder cam type lens, so called telescope type lens, in which a plurality of lens groups are provided. The lens may telescope forward and backward to change the positions of the lens groups to obtain the best focus for shooting. The cylinder cam type lens may move into the image capture device when it is not used for portability. Although the cylinder cam type lens may move into the image capture device, however, the lens groups in the cylinder cam type lens need a long distance to move for focusing so that the size of such lens structure is limited, and it will make the image capture device cannot reduce its size.

To overcome the drawback of the cylinder cam type lens as described above, a prism type lens was invented, and its structure is taught in Taiwan utility module patent M376769. The prism type lens has the lens groups received in the image capture device and reflects light to the lens groups though a total reflective prism, and then the lens groups are moved in a straight optical axis for focusing. The lens groups of the prism type lens do not have to extend out of the image capture device to reduce the structure of the telescope lens so that it may greatly reduce the thickness and weight of the image capture device to enhance the portability of the image capture device. Based on the increasing demand for the thin design, how to make a thin prism type lens is a main issue that the present manufactures are working for.

Figure 1:
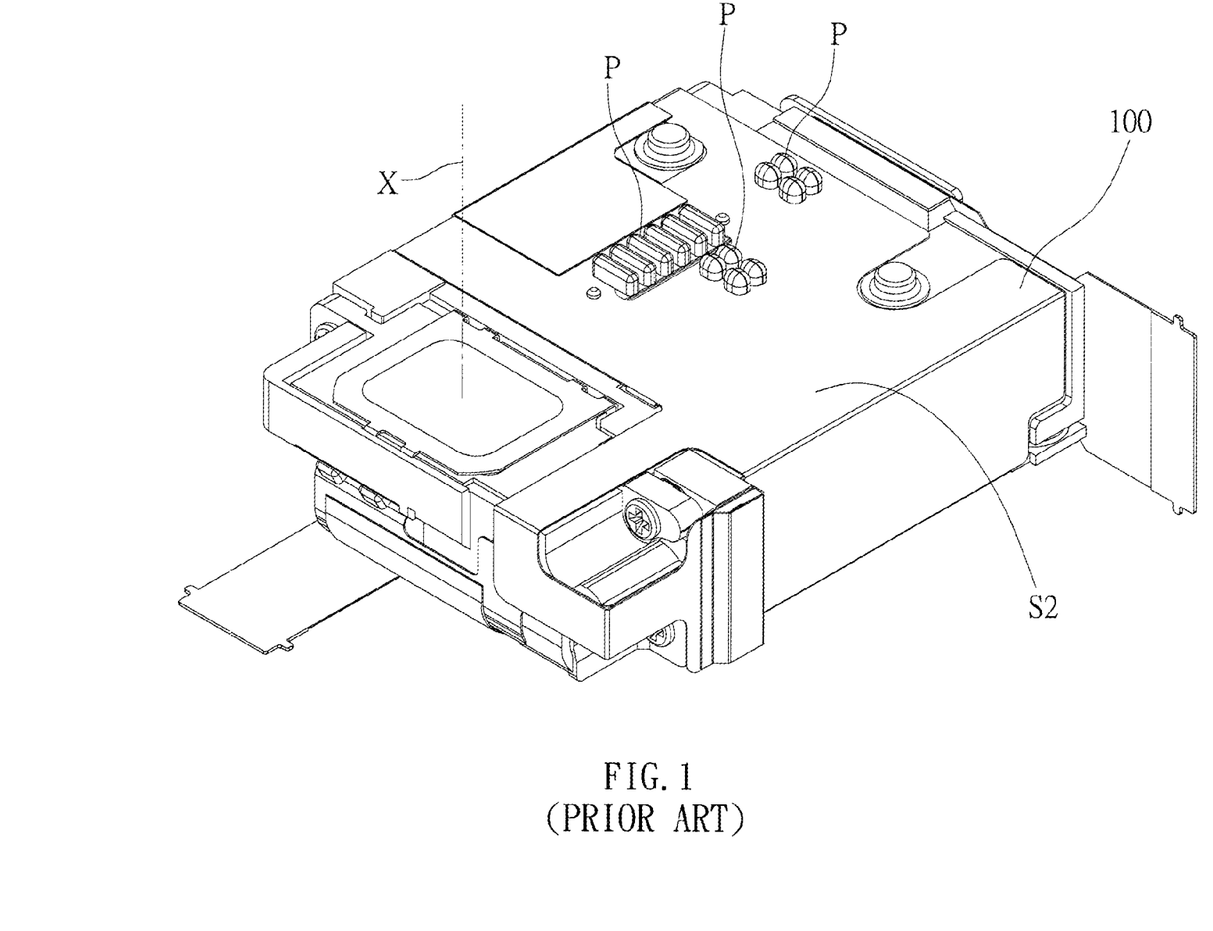
FIG. 1 is a perspective view of the conventional prism type lens.
Figure 2:
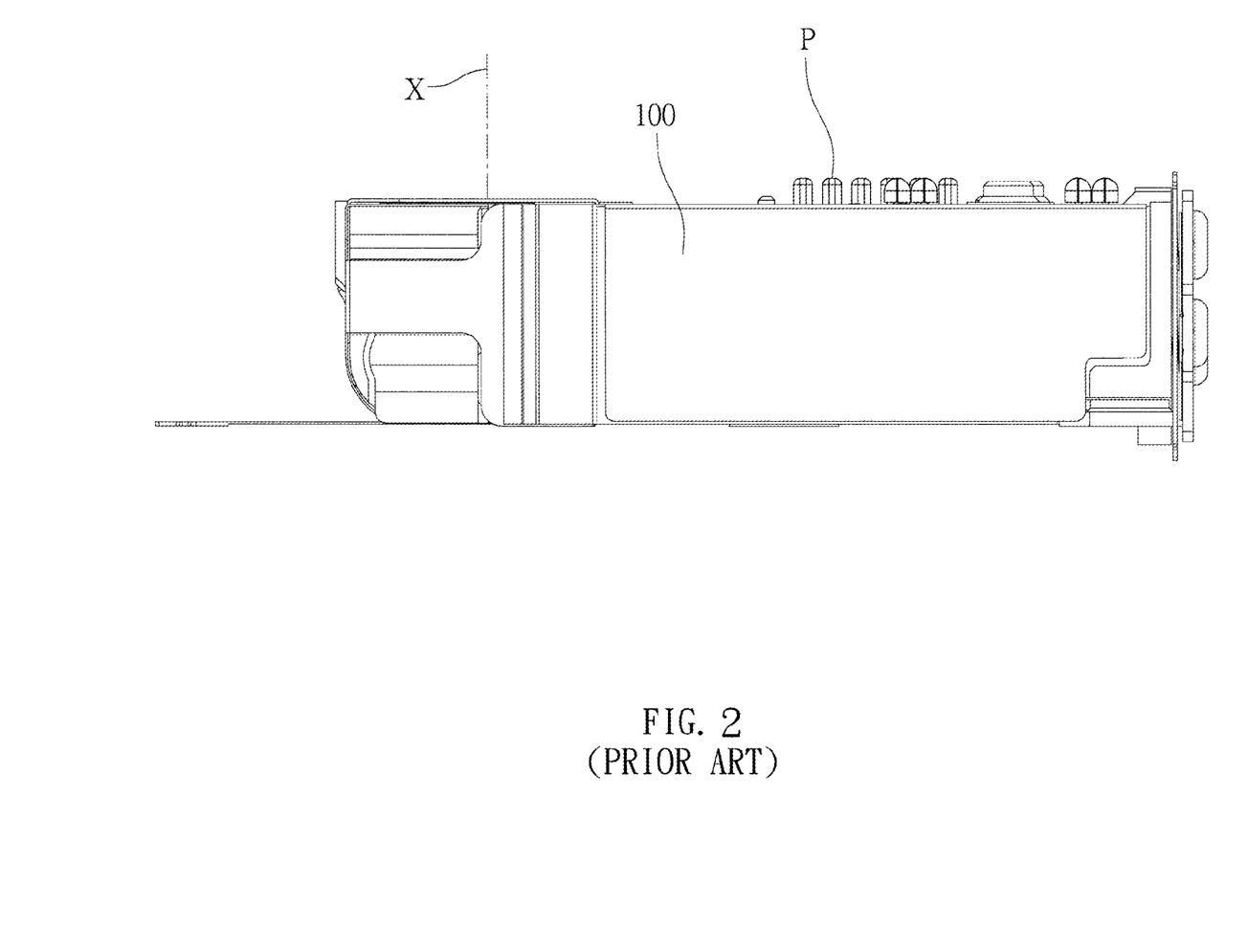
FIG. 2 is a lateral view of the conventional prism lens.

Besides, as shown in FIG. 1 and FIG. 2, the conventional prism type lens has many joints P exposing out of the case 100, such as the joints for inputting focusing activating signals, the joints for outputting focus detecting signals, the joints for inputting shutter activating signals, the joints for inputting zooming activating signals, the joints for outputting zooming detecting signals . . . , for various signals input and output to control focusing, zooming, and shutter in the following procedures. However, the joints are provided on a side S2 of the case which is vertical to the optical axis X. Therefore, the total thickness of the prism type lens will be the thickness of the case 100 plus the height of the joints P. Besides, when other devices of the image capture device, such as flexible printed circuit board, are electrically connected to the joints P, it will further increase the total thickness and fail to achieve the purpose of reducing the thickness. Therefore, there still are some places need to be improved in the conventional lens module for reducing the thickness.

SUMMARY OF THE INVENTION

The primary objective of the present invention is to provide a thin lens module, which has a better result in reducing the thickness of the image capture device equipped with the thin lens module of the present invention.

According to the objective of the present invention, a thin lens module includes a case, an optical lens set, which is provided in the case, having an optical axis with a first optical axis section and a second optical axis section, and a focusing lens group, wherein the first optical axis section is perpendicular to an object side, and the focusing lens group is provided in the case to reciprocate in the second optical axis section, a focusing driving device provided in the case and connected to the focusing lens group to move the focusing lens group in the second optical axis section; and a position indicator for the focusing lens group, which is provided in the case to detect the focusing lens group and generate a focusing detective signal accordingly when the focusing lens group arrives at a predetermined position, wherein the position indicator connects to at least a joint on the case to transmit the focusing detective signal out, and the joint is on a side of the case which is parallel to the first optical axis section.

In an embodiment, the thin lens module further includes a shutter and a shutter driving device, wherein the shutter is provided in the case to determine light entering the case to emit through the optical lens set or not, and the shutter driving device is provided in the case and connects to the shutter to control the shutter, and further wherein the shutter driving device further connects to at least a joint on the case for inputting shutter activating signals to control the shutter driving device accordingly, and the joint is on a side of the case which is parallel to the first optical axis section.

In an embodiment, the thin lens module further includes a zooming driving device and a position indicator, wherein the optical lens set further includes a zooming lens group to move in the optical axis of the optical lens set, the zooming driving device is provided in the case and connects to the zooming lens group to move the zooming lens group, and the position indicator detects the zooming lens group and generates a zooming detective signal accordingly when the zooming lens group arrives at a predetermined position, and further wherein the position indicator connects to at least a joint to transmit the zooming detective signal out, and the joint is on a side of the case which is parallel to the first optical axis section.

In an embodiment, the case has a slot communicated with outside, and the focusing driving device has a focusing motor received in the slot, and further wherein at least a joint for inputting focusing activating signals is provided on the focusing motor and is received in the slot to control the focusing according to the focusing activating signals from outside.

In an embodiment, the first optical axis section is substantially perpendicular to the second optical axis section, and the joint connected to the position indicator for the focusing lens group is on a side of the case which is parallel to both the first optical axis section and the second optical axis section.

In an embodiment, the first optical axis section is substantially perpendicular to the second optical axis section, and the joint connected to the shutter driving device is on a side of the case which is parallel to both the first optical axis section and the second optical axis section.

In an embodiment, the first optical axis section is substantially perpendicular to the second optical axis section, and the joint connected to the zooming driving device is on a side of the case which is parallel to both the first optical axis section and the second optical axis section.

The present invention further provides a thin lens module which includes a case; an optical lens set, which is provided in the case, having an optical axis with a first optical axis section and a second optical axis section, and a focusing lens group, wherein the first optical axis section is perpendicular to an object side, and the focusing lens group is provided in the case to reciprocate in the second optical axis section; a focusing driving device provided in the case and connected to the focusing lens group to move the focusing lens group in the second optical axis section; a shutter provided in the case to determine light entering the case to emit through the optical lens set or not; and a shutter driving device provided in the case and connecting to the shutter to control the shutter, wherein the shutter driving device further connects to at least a joint for inputting shutter activating signals to control the shutter driving device accordingly, and the joint is on a side of the case which is parallel to the first optical axis section.

In an embodiment, the thin lens module further includes a zooming driving device and a position indicator, wherein the optical lens set further includes a zooming lens group to move in the optical axis of the optical lens set, the zooming driving device is provided in the case and connects to the zooming lens group to move the zooming lens group, and the position indicator detects the zooming lens group and generates a zooming detective signal accordingly when the zooming lens group arrives at a predetermined position, and further wherein the position indicator connects to at least a joint to transmit the zooming detective signal out, and the joint is on a side of the case which is parallel to the first optical axis section.

In an embodiment, the case has a slot communicated with outside, and the focusing driving device has a focusing motor received in the slot, and further wherein at least a joint for inputting focusing activating signals is provided on the focusing motor and is received in the slot to control the focusing according to the focusing activating signals from outside.

In an embodiment, the first optical axis section is substantially perpendicular to the second optical axis section, and the joint connected to the shutter driving device is on a side of the case which is parallel to both the first optical axis section and the second optical axis section.

In an embodiment, the first optical axis section is substantially perpendicular to the second optical axis section, and the joint connected to the zooming driving device is on a side of the case which is parallel to both the first optical axis section and the second optical axis section.

The present invention further provides a thin lens module which includes a case; an optical lens set, which is provided in the case, having an optical axis with a first optical axis section and a second optical axis section, a focusing lens group, and a zooming lens group, wherein the first optical axis section is perpendicular to an object side, the focusing lens group is provided in the case to reciprocate in the second optical axis section, and the zooming lens group is provided in the case to move in the optical axis of the optical lens set; a focusing driving device provided in the case and connected to the focusing lens group to move the focusing lens group in the second optical axis section; a zooming driving device provided in the case and connected to the zooming lens group to move the zooming lens group; and a position indicator for the zooming lens group provided in the case to detect the zooming lens group and generate a zooming detective signal accordingly when the zooming lens group arrives at a predetermined position, wherein the position indicator connects to at least a joint to transmit the zooming detective signal out, and the joint is on a side of the case which is parallel to the first optical axis section.

In an embodiment, the case has a slot communicated with outside, and the focusing driving device has a focusing motor received in the slot, and further wherein at least a joint for inputting focusing activating signals is provided on the focusing motor and is received in the slot to control the focusing according to the focusing activating signals from outside.

In an embodiment, the first optical axis section is substantially perpendicular to the second optical axis section, and the joint connected to the zooming driving device is on a side of the case which is parallel to both the first optical axis section and the second optical axis section.

The present invention further provides a thin lens module which includes a case having a slot communicated with outside; an optical lens set, which is provided in the case, having a focusing lens group provided in the case to reciprocate in an optical axis of the optical lens set; and a focusing driving device provided in the case and connected to the focusing lens group to move the focusing lens group in the optical axis, wherein the focusing driving device has a focusing motor received in the slot, on which at least a joint for inputting focusing activating signals is provided and is received in the slot to control the focusing according to the focusing activating signals from outside.

Therefore, the present invention provides the thin lens module with a thinner thickness than the conventional device and consequently reduces the total thickness of the image capture device equipped with the lens module of the present invention.

DETAILED DESCRIPTION OF THE INVENTION

Figure 3:
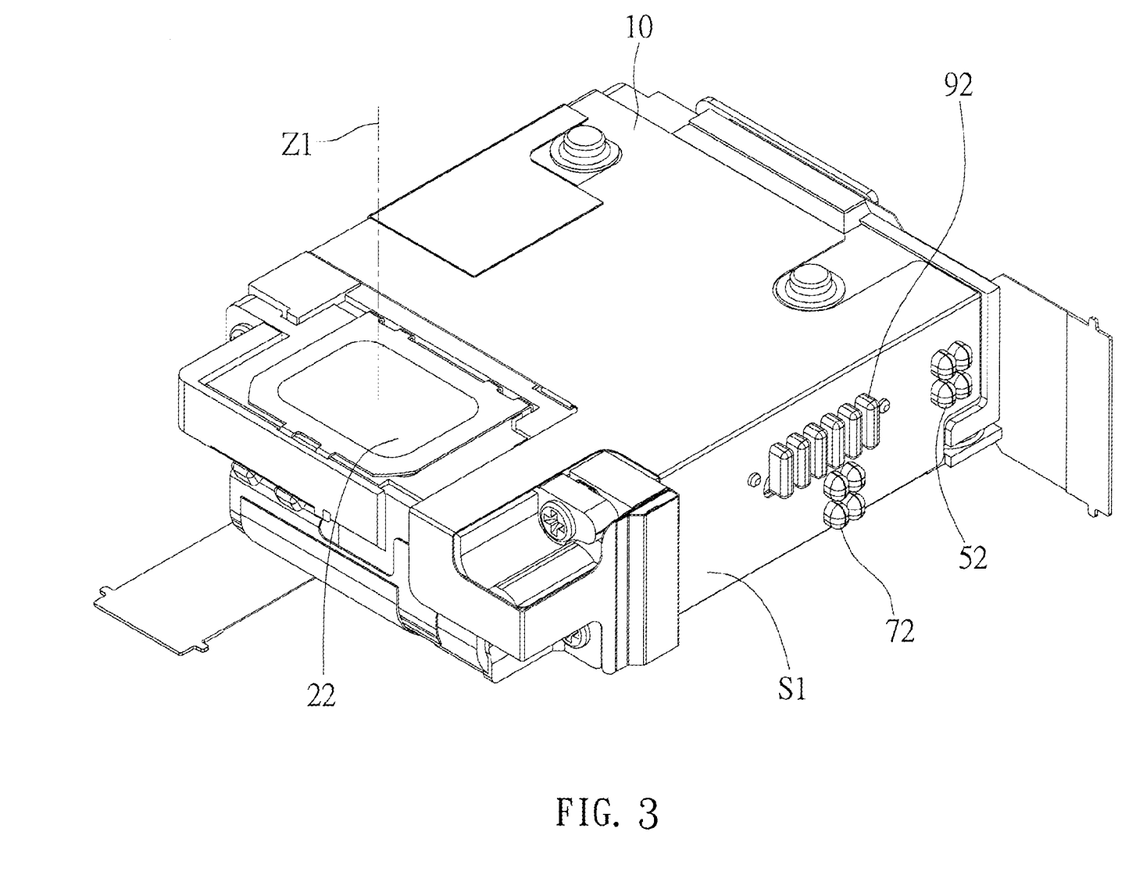
FIG. 3 is a perspective view of a preferred embodiment of the present invention.
Figure 4:
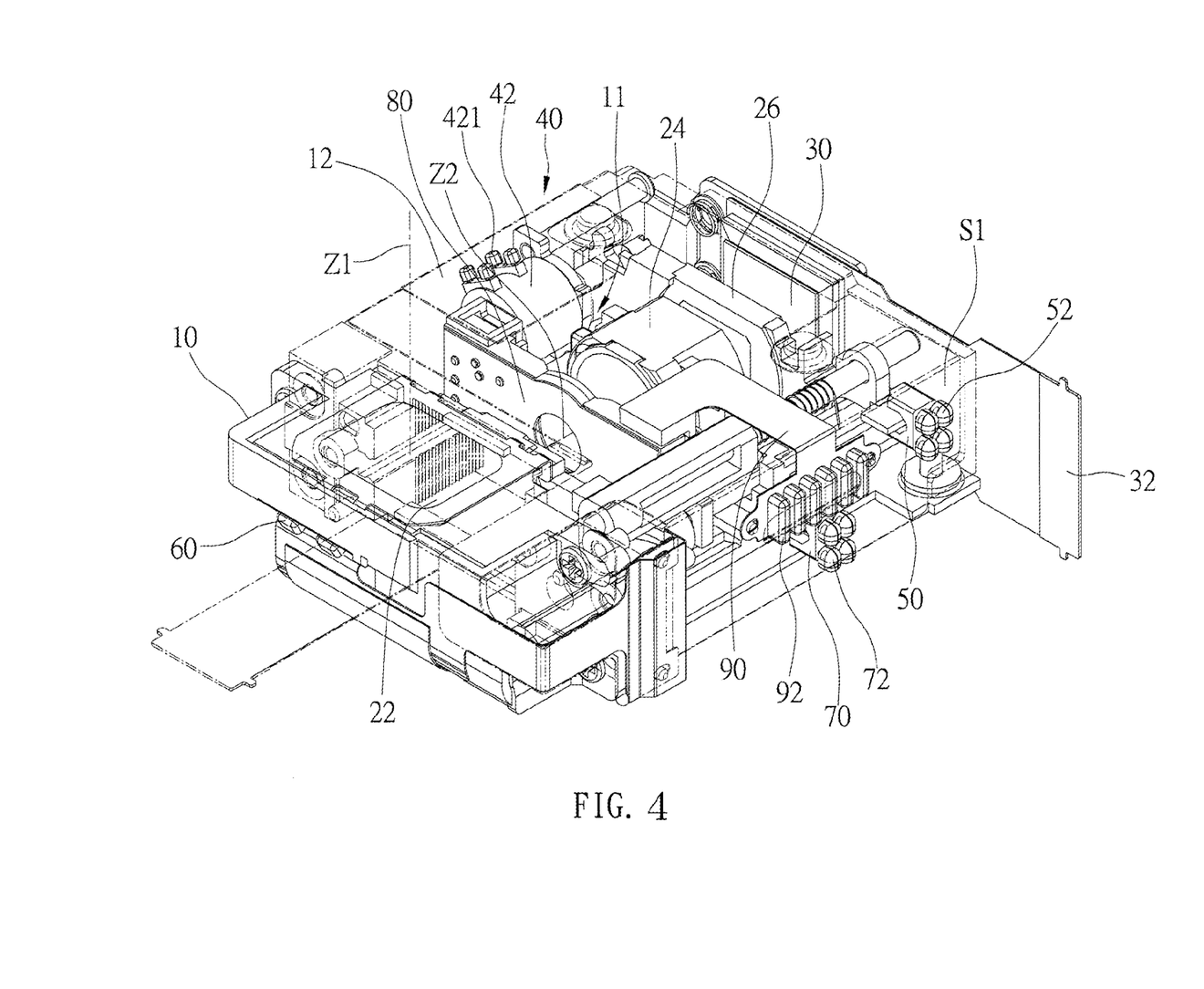
FIG. 4 is a perspective view through the case of the preferred embodiment of the present invention.
Figure 5:
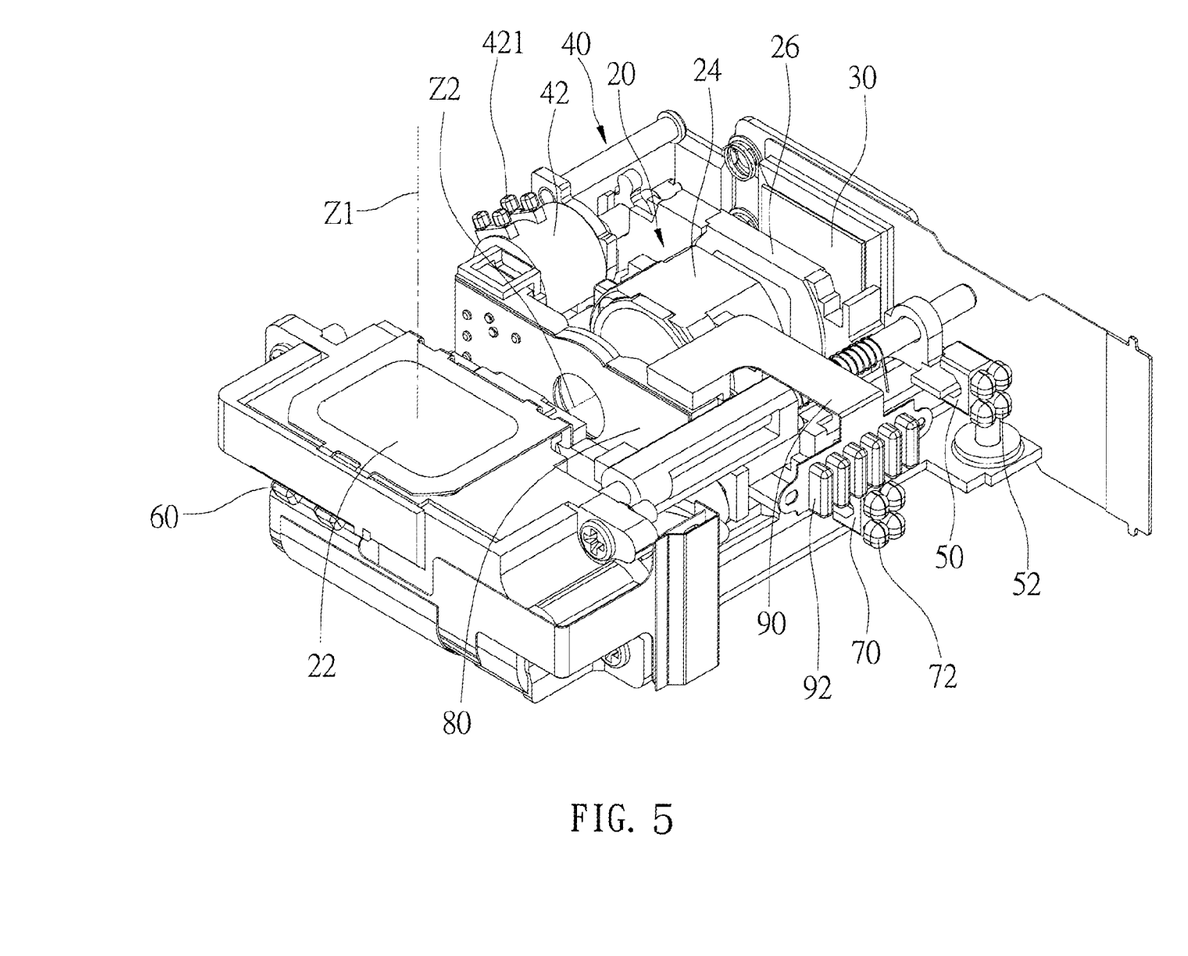
FIG. 5 is a perspective view of the preferred embodiment of the present invention, showing the inside structure.

As shown in FIG. 3 to FIG. 5, a thin lens module of the preferred embodiment of the present invention includes a case 10, an optical lens set 20, an image sensor 30, a focusing driving device 40, two position indicators (PI) 50, 70, a zooming driving device 60, a shutter 80, and a shutter driving device 90, wherein:

The case 10 has a chamber 11 therein and a slot 12 thereon to communicate with outside.

The optical lens set 20 is provided in the chamber 11 of the case 10 which includes a first optical axis section Z1 and a second optical axis section Z2 in an optical axis from an object side to an image side. The first optical axis section Z1 connects to the second optical axis section Z2, and respectively is perpendicular to the object side and the second optical axis section Z2. The optical lens set 20 further includes a dustproof lens 22, a zooming lens group 24, and a focusing lens group 26 in sequence from the object side to the image side. The dustproof lens 22 is on the first optical axis section Z1. The zooming lens group 24 and the focusing lens group 26 are on the second optical axis section Z2 to be moved in the second optical axis section Z2 for zooming and focusing. Of course, it may design the zooming lens group 24 to move in the first optical axis section Z1 for the same purpose.

The image sensor 30 is provided in the chamber 11 of the case 10 and is at a tail end of the optical axis to receive light entering the case 10 and passing through the optical lens set 20, and to transform optical signals into electrical signals and transmit the electrical signals out through a flexible circuit board. In the present embodiment, the image sensor 30 may be a complementary metal-oxide-semiconductor (CMOS), charge-coupled device (CCD), or other devices that may receive image optical signals and transform them into corresponding electrical signals.

The focusing driving device 40 is provided in the case 10 and is connected to the focusing lens group 26 to move the focusing lens group 26 for focusing. In the present embodiment, the focusing driving device 40 has a focusing motor 42 received in the slot 12. The focusing motor 42 has a plurality of joints 421 for inputting focusing activating signals to receive the focusing activating signals from outside and control the focusing motor 42 accordingly. The focusing motor 42 may move the focusing motor 42 through gears, belt, or other transmission devices.

The position indicator 50 is provided in the chamber 11 of the case 10 to detect the focusing lens 26. The position indicator 50 will generate a focusing detective signal when the focusing lens 26 arrives at a predetermined position. Besides, the position indicator 50 has a plurality of joints 52 on the case 10 for outputting the focusing detective signals to outside, such as processor of camera, and the joints 52 is on a side S1 of the case 10 which is parallel to both the first optical axis section Z1 and the second optical axis section Z2. In the present embodiment, the position indicator 50 is a photo interrupter to achieve the detection purpose by the light being interrupted by the focusing lens group 26 when the focusing lens group 26 arrives at the predetermined position. It may use IR sensor, magnetic sensor, or other equivalent devices to detect the position of the focusing lens group 26 as well.

The zooming driving device 60 is provided in the case 10 and connects to the zooming lens group 24 to move the zooming lens group 24 for zooming. In the present embodiment, the zooming driving device 60 moves the zooming lens group 24 through gears. The same as above, it may use aforesaid devices to achieve the same purpose.

The position indicator 70 is provided in the case 10 to detect the zooming lens 24. The position indicator 70 will generate a zooming detective signal when the zooming lens 24 arrives at a predetermined position. The position indicator 70 has a plurality of joints 72 on the case 10 for outputting the zooming detective signals to outside. The joints 72 are on the side S1 of the case 10 as well. In the present embodiment, the position indicator 70 is a photo interrupter, and it may use aforesaid devices to achieve the same purpose.

The shutter 80 is provided in the case 10 to determine the light entering the case 10 to emit through the optical lens set 20 or not.

The shutter driving device 90 is provided in the case 10 to control the shutter 80. Besides, the shutter driving device 90 controls the shutter 80 through electrical or electronic device, and it may use mechanic device also. Besides, the shutter driving device 90 has a plurality of joints 92 on the case 10 for inputting shutter activating signals to allow the signals to input from outside to control the shutter driving device 90. The joints 92 are on the side S1 of the case 10.

Figure 6:
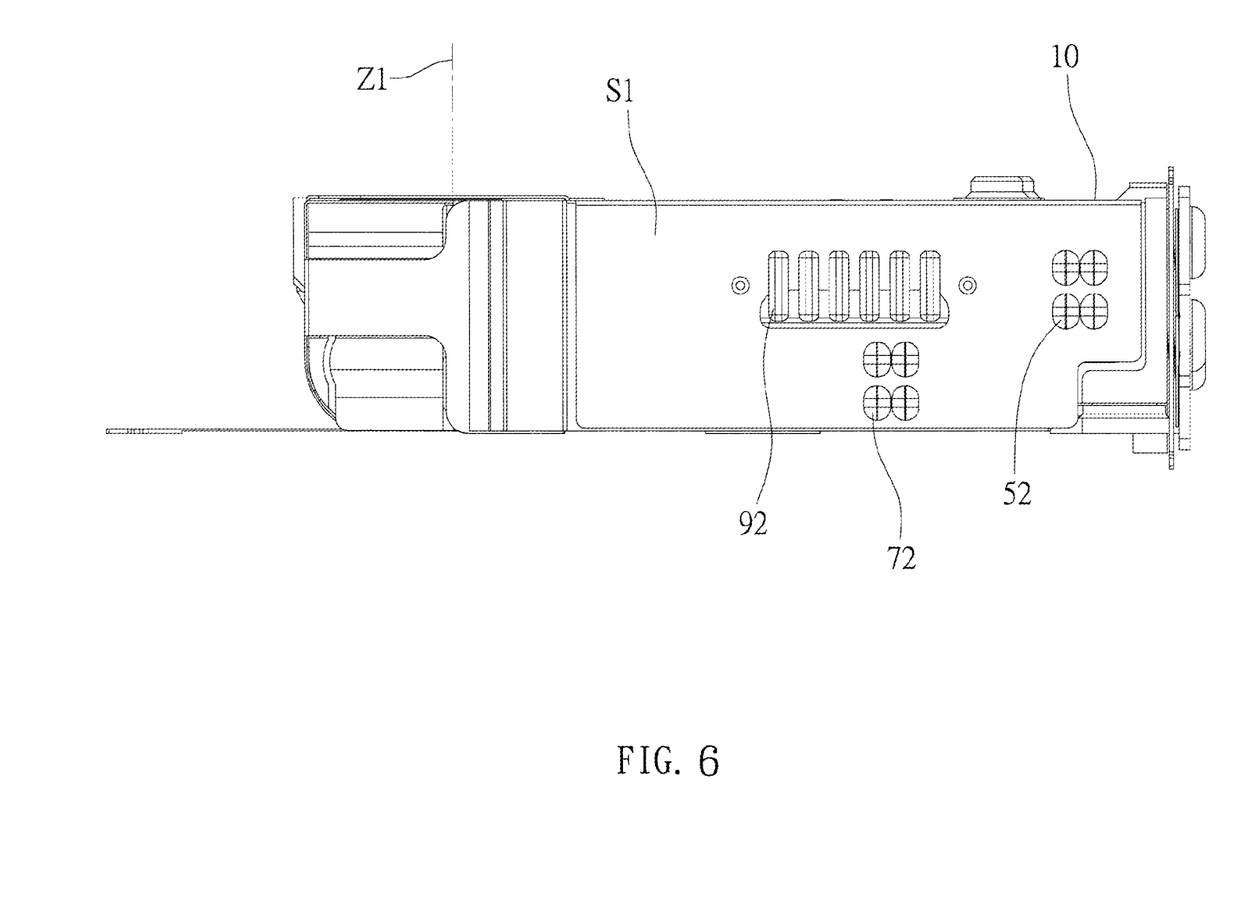
FIG. 6 is a lateral view of the preferred embodiment of the present invention.

As shown in FIG. 6, the joints 52, 72, 92 are provided on the side S1 which is parallel to both the first optical axis section Z1 and the second optical axis section Z2, and the joints 421 of the focusing motor 42 is hidden. To compare with the conventional prism type lens as shown in FIG. 2, the design of the present invention may prevent the total thickness of lens module from being increasing by the height the joints 52, 72, 92 to make the lens module thinner and lighter. Of course, it is not necessary to limit the joints 52, 72, 92 on the parallel to the first optical axis section Z1 and the second optical axis section Z2, any design to move the joints 52, 72, 92 to any side of the case 10 other than the side perpendicular to the first optical axis section Z1 may achieve the purpose of the present invention.

Besides, any other design except for all the joints 52, 72, 92 on the side of the case 10 other than the side perpendicular to the first optical axis section Z1, it may provide one joint or some joints on the side of the case 10 other than the side perpendicular to the first optical axis section Z1.

Besides, except for the design of changing the locations of the joints 52, 72, 92, it may design the flexible circuit board 32 with a predetermined bending angle, or move the bolts for fastening the prism type lens, joints for the temperature sensor, or any electronic device that is exposed out of the case 10 to the side of the case 10 other than the side perpendicular to the first optical axis section Z1 to achieve the thinning purpose of the present invention.

It has to be noted that the idea of thinning design of the present invention is not limited in the prism type lens module with two perpendicular optical axis section Z1, Z2, it may be applied in the telescope lens, prime lens, or other lens modules with the first optical axis section Z1 and the second optical axis section Z2 in a straight axis. The description above is a few preferred embodiments of the present invention and the equivalence of the present invention is still in the scope of claim construction of the present invention.

What is claimed is:

1. A thin lens module, comprising:
a case;
an optical lens set, which is provided in the case, having an optical axis with a first optical axis section and a second optical axis section, and a focusing lens group, wherein the first optical axis section is perpendicular to an object side, and the focusing lens group is provided in the case to reciprocate in the second optical axis section;
a focusing driving device provided in the case and connected to the focusing lens group to move the focusing lens group in the second optical axis section; and
a position indicator for the focusing lens group, which is provided in the case to detect the focusing lens group and generate a focusing detective signal accordingly when the focusing lens group arrives at a predetermined position, wherein the position indicator connects to at least a joint on the case to transmit the focusing detective signal out, and the joint is only on a side of the case which is parallel to the first optical axis section; and
wherein the joint extends out of the case to receive the focusing detective signal of the position indicator and transmits the focusing detective signal to outside.

2. The thin lens module as defined in claim 1, further comprising a shutter and a shutter driving device, wherein the shutter is provided in the case to determine light entering the case to emit through the optical lens set or not, and the shutter driving device is provided in the case and connects to the shutter to control the shutter, and further wherein the shutter driving device further connects to at least a joint on the case for inputting shutter activating signals to control the shutter driving device accordingly, and the joint is on a side of the case which is parallel to the first optical axis section.

3. The thin lens module as defined in claim 1, further comprising a zooming driving device and a position indicator, wherein the optical lens set further includes a zooming lens group to move in the optical axis of the optical lens set, the zooming driving device is provided in the case and connects to the zooming lens group to move the zooming lens group, and the position indicator detects the zooming lens group and generates a zooming detective signal accordingly when the zooming lens group arrives at a predetermined position, and further wherein the position indicator connects to at least a joint to transmit the zooming detective signal out, and the joint is on a side of the case which is parallel to the first optical axis section.

4. The thin lens module as defined in claim 1, wherein the case has a slot communicated with outside, and the focusing driving device has a focusing motor received in the slot, and further wherein at least a joint for inputting focusing activating signals is provided on the focusing motor and is received in the slot to control the focusing according to the focusing activating signals from outside.

5. The thin lens module as defined in claim 1, wherein the first optical axis section is substantially perpendicular to the second optical axis section, and the joint connected to the position indicator for the focusing lens group is on a side of the case which is parallel to both the first optical axis section and the second optical axis section.

6. The thin lens module as defined in claim 1, wherein the first optical axis section is substantially perpendicular to the second optical axis section, and the joint connected to the shutter driving device is on a side of the case which is parallel to both the first optical axis section and the second optical axis section.

7. The thin lens module as defined in claim 3, wherein the first optical axis section is substantially perpendicular to the second optical axis section, and the joint connected to the zooming driving device is on a side of the case which is parallel to both the first optical axis section and the second optical axis section.

8. A thin lens module, comprising:
  a case;
  an optical lens set, which is provided in the case, having an optical axis with a first optical axis section and a second optical axis section, and a focusing lens group, wherein the first optical axis section is perpendicular to an object side, and the focusing lens group is provided in the case to reciprocate in the second optical axis section;
  a focusing driving device provided in the case and connected to the focusing lens group to move the focusing lens group in the second optical axis section;
  a shutter provided in the case to determine light entering the case to emit through the optical lens set or not; and
  a shutter driving device provided in the case and connecting to the shutter to control the shutter, wherein the shutter driving device further connects to at least a joint for inputting shutter activating signals to control the shutter driving device accordingly, and the joint is only on a side of the case which is parallel to the first optical axis section; and
  wherein the joint extends out of the case to receive the shutter activating signals from outside and transmits the shutter activating signals to the shutter driving device.

9. The thin lens module as defined in claim 8, further comprising a zooming driving device and a position indicator, wherein the optical lens set further includes a zooming lens group to move in the optical axis of the optical lens set, the zooming driving device is provided in the case and connects to the zooming lens group to move the zooming lens group, and the position indicator detects the zooming lens group and generates a zooming detective signal accordingly when the zooming lens group arrives at a predetermined position, and further wherein the position indicator connects to at least a joint to transmit the zooming detective signal out, and the joint is on a side of the case which is parallel to the first optical axis section.

10. The thin lens module as defined in claim 8, wherein the case has a slot communicated with outside, and the focusing driving device has a focusing motor received in the slot, and further wherein at least a joint for inputting focusing activating signals is provided on the focusing motor and is received in the slot to control the focusing according to the focusing activating signals from outside.

11. The thin lens module as defined in claim 8, wherein the first optical axis section is substantially perpendicular to the second optical axis section, and the joint connected to the shutter driving device is on a side of the case which is parallel to both the first optical axis section and the second optical axis section.

12. The thin lens module as defined in claim 9, wherein the first optical axis section is substantially perpendicular to the second optical axis section, and the joint connected to the zooming driving device is on a side of the case which is parallel to both the first optical axis section and the second optical axis section.

13. A thin lens module, comprising:
  a case;
  an optical lens set, which is provided in the case, having an optical axis with a first optical axis section and a second optical axis section, a focusing lens group, and a zooming lens group, wherein the first optical axis section is perpendicular to an object side, the focusing lens group is provided in the case to reciprocate in the second optical axis section, and the zooming lens group is provided in the case to move in the optical axis of the optical lens set;
  a focusing driving device provided in the case and connected to the focusing lens group to move the focusing lens group in the second optical axis section;
  a zooming driving device provided in the case and connected to the zooming lens group to move the zooming lens group; and
  a position indicator for the zooming lens group provided in the case to detect the zooming lens group and generate a zooming detective signal accordingly when the zooming lens group arrives at a predetermined position, wherein the position indicator connects to at least a joint to transmit the zooming detective signal out, and the joint is only on a side of the case which is parallel to the first optical axis section; and
  wherein the joint extends out of the case to receive the focusing detective signal from the position indicator and transmits the focusing detective signal to outside.

14. The thin lens module as defined in claim 13, wherein the case has a slot communicated with outside, and the focusing driving device has a focusing motor received in the slot, and further wherein at least a joint for inputting focusing activating signals is provided on the focusing motor and is received in the slot to control the focusing according to the focusing activating signals from outside.

15. The thin lens module as defined in claim 14, wherein the first optical axis section is substantially perpendicular to the second optical axis section, and the joint connected to the zooming driving device is on a side of the case which is parallel to both the first optical axis section and the second optical axis section.

* * * * *